(12) United States Patent
Lu et al.

(10) Patent No.: US 11,822,775 B2
(45) Date of Patent: Nov. 21, 2023

(54) METHOD AND DEVICE FOR ARRANGING WINDOWS, TERMINAL, AND STORAGE MEDIUM

(71) Applicant: BEIJING BYTEDANCE NETWORK TECHNOLOGY CO., LTD., Beijing (CN)

(72) Inventors: Zechun Lu, Beijing (CN); Zichun Li, Beijing (CN); Chi Fang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 47 days.

(21) Appl. No.: 17/618,385

(22) PCT Filed: Jun. 10, 2020

(86) PCT No.: PCT/CN2020/095436
§ 371 (c)(1),
(2) Date: Dec. 10, 2021

(87) PCT Pub. No.: WO2020/249023
PCT Pub. Date: Dec. 17, 2020

(65) Prior Publication Data
US 2022/0350469 A1 Nov. 3, 2022

(30) Foreign Application Priority Data
Jun. 11, 2019 (CN) .......................... 201910502044.7

(51) Int. Cl.
*G06F 3/048* (2013.01)
*G06F 3/04845* (2022.01)
*G06F 3/04842* (2022.01)

(52) U.S. Cl.
CPC ...... *G06F 3/04845* (2013.01); *G06F 3/04842* (2013.01)

(58) Field of Classification Search
CPC .......................... G06F 3/04845; G06F 3/04842
See application file for complete search history.

(56) References Cited

U.S. PATENT DOCUMENTS

| | | | |
|---|---|---|---|
| 5,771,042 A | 6/1998 | Santos-Gomez | |
| 8,806,369 B2 * | 8/2014 | Khoe .................. | G06F 3/04883 715/764 |

(Continued)

FOREIGN PATENT DOCUMENTS

| | | |
|---|---|---|
| CN | 104915244 A | 9/2015 |
| CN | 106293314 A | 1/2017 |

(Continued)

OTHER PUBLICATIONS

International Application No. PCT/CN2020/095436, International Search Report dated Sep. 15, 2020, 2 pages.

(Continued)

*Primary Examiner* — David Phantana-angkool

(57) ABSTRACT

A method and device for arranging windows, a terminal, and a storage medium. The method for arranging windows comprises: acquiring, according to a preset trigger operation, a first window and a second window to be arranged; adjusting boundary coordinates of the first window or the second window, such that the first window and the second window are disposed one above the other, wherein the first window and the second window partially overlap with each other. The method for arranging windows meets the need of a user to display and arrange multiple windows in a multi-tasking environment, thereby improving user experience.

18 Claims, 6 Drawing Sheets

(56) References Cited

U.S. PATENT DOCUMENTS

| | | | |
|---|---|---|---|
| 9,411,487 B2* | 8/2016 | Ording | G06F 3/0482 |
| 10,042,655 B2* | 8/2018 | Kaufthal | G06F 9/451 |
| 10,209,849 B2* | 2/2019 | Kaufthal | G06F 3/04845 |
| 10,394,441 B2* | 8/2019 | Louch | G06F 3/0488 |
| 10,402,034 B2* | 9/2019 | Kaufthal | G06F 3/0481 |
| 2006/0146059 A1* | 7/2006 | Inoue | G06F 3/0481 345/546 |
| 2012/0096396 A1* | 4/2012 | Ording | G06F 3/0481 715/799 |
| 2013/0097556 A1* | 4/2013 | Louch | G06F 9/451 715/790 |
| 2013/0227472 A1* | 8/2013 | Sosinski | G06F 3/03547 715/788 |
| 2015/0248191 A1* | 9/2015 | Ording | G06F 3/0482 715/790 |
| 2017/0357418 A1* | 12/2017 | Dunn | G06F 3/0481 |
| 2018/0181261 A1* | 6/2018 | Saurabh | G06F 9/451 |
| 2021/0303141 A1* | 9/2021 | Dunn | G06F 9/451 |
| 2022/0350469 A1* | 11/2022 | Lu | G06F 3/04845 |

FOREIGN PATENT DOCUMENTS

| | | |
|---|---|---|
| CN | 106462354 A | 2/2017 |
| CN | 109313526 A | 2/2019 |
| CN | 110196669 A | 9/2019 |

OTHER PUBLICATIONS

Chinese Patent Application No. 201910502044.7, First Office Action dated May 29, 2020, 9 pages.

Chinese Patent Application No. 201910502044.7, Second Office Action dated Nov. 11, 2020, 4 pages.

Chinese Patent Application No. 201910502044.7, Rejection dated Feb. 19, 2021, 4 pages.

* cited by examiner

METHOD AND DEVICE FOR ARRANGING WINDOWS, TERMINAL, AND STORAGE MEDIUM

CROSS REFERENCE TO RELATED APPLICATIONS

The present application is the U.S. National Stage of International Application No. PCT/CN2020/095436, filed on Jun. 10, 2020, which claims priority to Chinese Patent Application No. 201910502044.7, filed on Jun. 11, 2019 and entitled "METHOD AND DEVICE FOR ARRANGING WINDOWS, TERMINAL, AND STORAGE MEDIUM", the entire contents of which are incorporated herein by reference.

FIELD

The embodiments of the present disclosure relate to the technical field of computers, and more specifically relate to a window arrangement method and apparatus, and a terminal and a storage medium.

BACKGROUND

At present, with the enrichment of application program types and the improvement of functions, there is a demand for a multi-task environment. In order to meet the user interaction needs for higher novelty and functional diversity, users can implement a multi-task environment with multiple applications on large-screen intelligent terminals.

However, in the multi-task environment with the multiple applications, due to a large number of windows, it is easy to cause confusion in screen displaying when the windows are in a certain number, thereby reducing the user's operation efficiency and the user experience in the multi-task environment. Therefore, there is an urgent need for a method and apparatus for arranging and displaying a plurality of application windows in the multi-task environment.

SUMMARY

In order to solve the above-mentioned problems, the present disclosure provides a window arrangement method and apparatus, and a terminal and a storage medium to realize ordered and convenient arrangement of windows, improve the operation convenience of a user in a multi-task environment with a plurality of applications, and improve the user experience.

An embodiment of the present disclosure provides a window arrangement method, the window arrangement method comprises: obtaining, according to a preset trigger operation, a first window and a second window to be arranged; laminating the first window and the second window by means of adjusting boundary coordinates of the first window or the second window, wherein the first window and the second window partially overlap.

An embodiment of the present disclosure provides a window arrangement apparatus, the window arrangement apparatus comprises: a window obtaining module, configured to obtain, according to a preset trigger operation, a first window and a second window to be arranged; and a window arrangement module, configured to laminate the first window and the second window by means of adjusting boundary coordinates of the first window or the second window, wherein the first window and the second window partially overlap.

Another embodiment of the present disclosure provides a terminal, the terminal comprises: at least one memory and at least one processor, wherein the memory is used for storing program codes; the processor is used for calling the program codes stored in the memory to execute the above window arrangement method.

Another embodiment of the present disclosure provides a computer storage medium, wherein the computer storage medium stores program codes; the program codes are used for executing the above window arrangement method.

In the embodiments of the present disclosure, by means of laminating the windows, a window display region is neater and more orderly, so that the convenience of window lamination is improved, thus meeting a need of a user for displaying and arranging a plurality of windows in the multi-task environment and improving the user experience.

BRIEF DESCRIPTION OF THE DRAWINGS

In order to show the solutions in the embodiments of the present disclosure more clearly, the following will briefly explain the drawings that need to be used in the description of the embodiments. Obviously, the drawings in the following description are only some embodiments of the present disclosure. For those of ordinary skill in the art, without creative work, other drawings can be obtained based on these drawings.

DETAILED DESCRIPTION OF THE EMBODIMENTS

Figure 1:
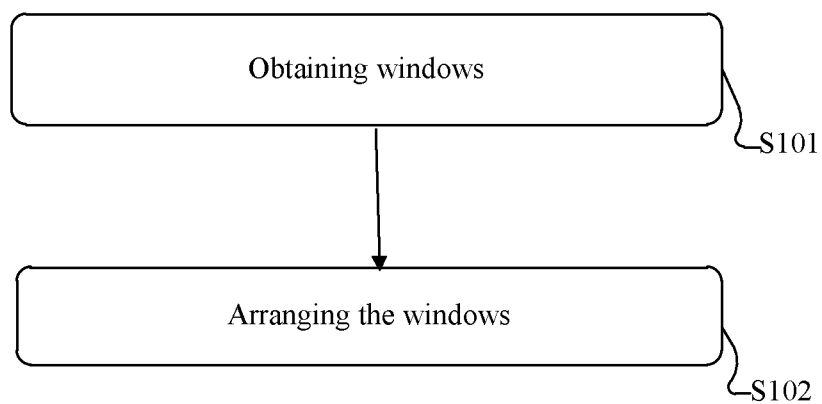
FIG. 1 illustrates a flow diagram of a window arrangement method according to an embodiment of the present disclosure.

The present disclosure will be further described in detail below in conjunction with the accompanying drawings and embodiments. It can be understood that specific embodiments described herein are merely intended to explain relevant disclosure, rather than to limit the present disclosure.

In addition, it should be noted that, for ease of description, the drawings only show part of the content related to the present disclosure, but not all of the content. Before discussing the exemplary embodiments in more detail, it should be mentioned that some exemplary embodiments are described as processes or methods depicted as flowcharts. Although the flowchart is described as various operations (or steps) as sequential processing, many of the operations can be implemented in parallel, concurrently, or simultaneously. In addition, the order of various operations can be rearranged. The processing may be terminated when its operation is completed, but may also have additional steps not included in the drawings. The processing may correspond to methods, functions, procedures, subroutines, subroutines, and so on.

At present, with the enrichment of application programs and the improvement of functions, there is a demand for multi-task environment. Users can implement a multi-task environment for multiple applications on large-screen smart terminals. For example, as mobile phone screens become larger, it also provides the possibility for a multi-task environment. In addition, some mobile phone terminals are equipped with a large-screen operating system. After the mobile phone is connected to the large-screen, the user can implement a multi-task environment for multiple applications on the large-screen. The window arrangement method of the present disclosure will be described below with reference to the accompanying drawings.

Referring to FIG. 1, an embodiment of the present disclosure provides a window arrangement method. The window arrangement method can be applied to a terminal. The terminal may be implemented in various forms. The terminal in the present disclosure may include, but is not limited to, a mobile phone, a smart phone, a laptop, a personal digital assistant (PDA), a PAD, a portable multimedia player (PMP), a navigation apparatus, a vehicle-mounted terminal device, a vehicle-mounted display terminal, a vehicle-mounted electronic rearview mirror, and other mobile terminal devices, and a digital TV, a desk computer, and other fixed terminal devices.

Figure 2:
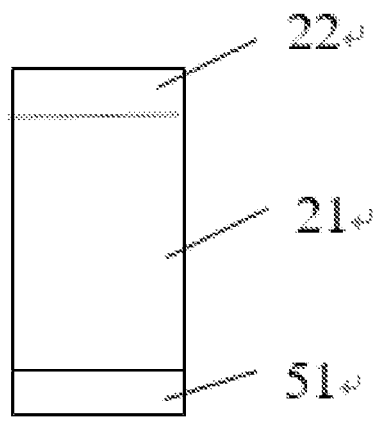
FIG. 2 to FIG. 9 illustrate schematic diagrams of window arrangement according to embodiments of the present disclosure.

The window arrangement method of the present disclosure includes a step S101 of window obtaining and a step S102 of window arrangement. In some embodiments, the window obtaining step may include: obtaining, according to a preset trigger operation, a first window and a second window to be arranged. In some embodiments, the preset trigger operation may include, but is not limited to, touch click, sliding, single click, speech control, and other operations. As shown in FIG. 2, the first window 21 and the second window 22 are laminated. In the present disclosure, as schematically shown in FIG. 2, lamination means that the arranged windows at least partially overlap. As an example, in FIG. 2, the second window 22 is laminated on the first window 21, wherein the first window 21 and the second window 22 partially overlap. For example, the second window 22 laminated above does not cover a preset region of the first window 21 below. In some embodiments, the preset region includes a window control bar. As shown in FIG. 2, in some embodiments, the second window 22 does not cover a window control bar 51 of the first window 21. Since the window control bar 51 of the first window 21 below is not covered, a user can conveniently operate the first window 21 through the window control bar 51. It should be understood that in the present disclosure, the first window 21 may also be laminated on the second window 22.

In some embodiments, the first window 21 and the second window 22 are laminated by means of adjusting boundary coordinates of the first window 21 or the second window 22, which will be described below.

Figure 3:
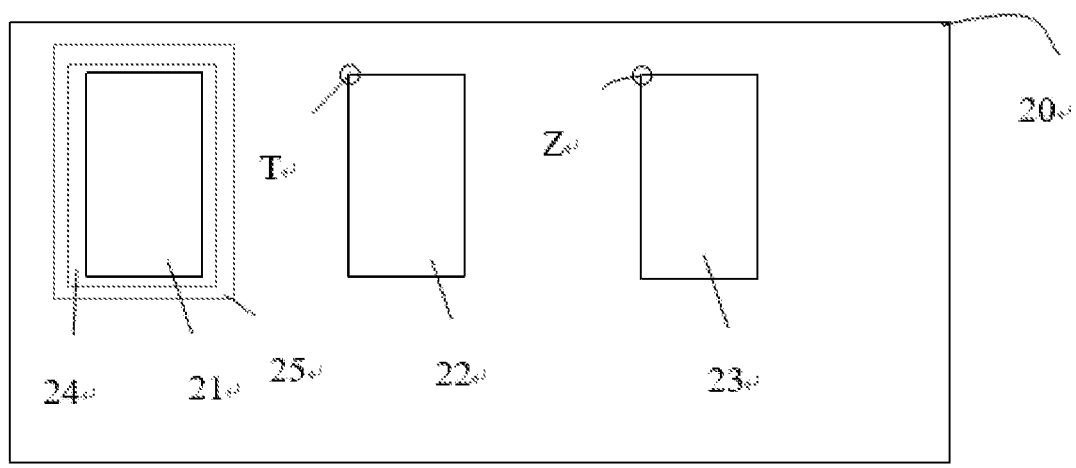

As shown in FIG. 3, the terminal may include a window display region 20, and a first window 21, a second window 22, and a third window 23 are displayed in the window display region 20 in response to open a corresponding application by a user. Although FIG. 3 illustrates three windows, it should be understood that this is only exemplary, and is not intended to limit the present disclosure. Any number of windows can be displayed in the window display region 20 according to a configuration of the terminal.

In some embodiments, the first window 21 corresponds to a first hot region 24. As shown in FIG. 3, a region where the first window 21 is located is included in a boundary range of the first hot region 24. However, this is only exemplary. The first hot region 24 may also be arranged to be within part of the region of the first window 21.

In some embodiments, the second window 22 includes a feature point T located in the second window 22. In FIG. 3, the feature point T is illustrated as a position at the upper left corner of the second window 22. However, it should be understood that the feature point T may be located at any coordinate position in the second window 22, for example, includes, but is not limited to positions of an upper left corner, an upper right corner, a lower left corner or a lower right corner of the second window 22, or even a position outside of the second window 22.

In some embodiments, when the feature point T of the second window 22 falls within the boundary range of the first hot region 24 in response to an operation event of the user, the second window 22 is automatically adsorbed onto the first window 21 so that the second window 22 is laminated on the first window 21. The operation event of the user generally includes moving the first window 21 or the second window 22, including, but not limited to, touch click dragging, sliding, speech control and other operations, that is, the moved window may be a window corresponding to the feature point, or may be a window corresponding to the hot region. The feature point T falling within the boundary region of the first hot region 24 may include enabling the feature point T to stay in the boundary range of the first hot region 24 for a period of time or performing a release operation in the boundary range of the first hot region 24. This period of time for stay may be, for example, 0.5 s and 1 s, which is only exemplary, and can be set by the user as needed.

Figure 4:
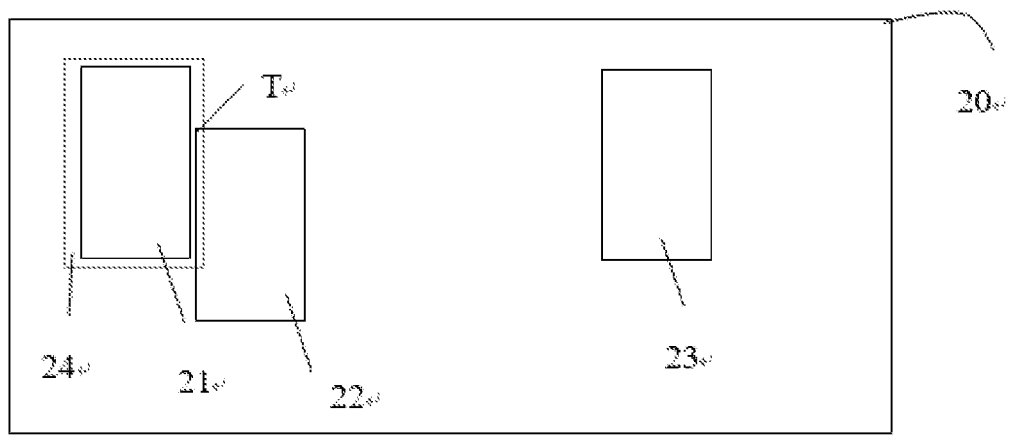
Figure 5:
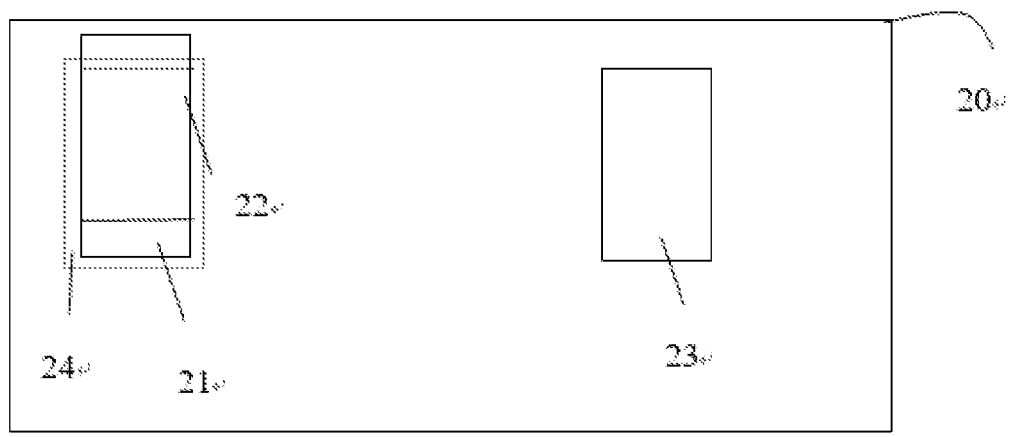

As shown in FIG. 4, the user drags the second window 22. At this time, the feature point T of the second window 22 falls within the boundary range of the first hot region 24 in response to the release operation of the user. As shown in FIG. 5, the second window 22 is adsorbed to be automatically laminated on the first window 21. It should be noted that although the first window 21 and the second window 22 are illustrated as left alignment in FIG. 5, the present disclosure is not limited to this. The first window 21 and the second window 22 may also be in right alignment, left-right centering alignment, top alignment, bottom alignment, or top-bottom centering alignment, and the like. In some embodiments, when the above any alignment method is adopted, the window that is laminated above does not cover the window control bar of the window below.

In the embodiment of the present disclosure, the first hot region 24 is an adsorption region for adsorbing other windows to the first window 21. When the second window 22, for example, is dragged from one column to another column where the first window 21 is located, the second window 22 is automatically adsorbed to a topmost layer of the column where the first window 21 is located. If the second window 22 is dragged out of the first hot region 24, automatic adsorption is no longer realized. It should be understood that when the second window 22, for example, is dragged from one column to another column where the first window 21 is located, it can also be set that the first window 21 is laminated on the second window 22. That is, the user can laminate, as needed, the window corresponding to the hot region, the window corresponding to the feature point, the moved window or the unmoved window on the other corresponding window.

It should be understood that the second window 22 may correspond to another hot region, and the first window 21 may correspond to another feature point. When another feature point corresponding to the first window 21 falls within the boundary range of another hot region in response to the operation event of the user, the first window 21 is laminated on the second window 22. This is the same as the principle of laminating the second window 22 on the first window 21. Another feature point of the first window 21 may have a feature corresponding to the feature point T of the second window 22. The another hot region of the second window 22 may have a feature corresponding to the first hot region 24 of the first window 21. For example, the region where the second window 22 is located is included in the boundary range of another hot region, or the another hot region is located in part of the region where the second window 22 is located. For example, the another feature point may be located inside or outside the second window 22. The another feature point may be located at the positions of the upper left corner, the upper right corner, the lower left corner or the lower right corner of the second window 22. For the purpose of simplicity, repeated descriptions are omitted here.

In the embodiment of the present disclosure, the positions of the first hot region, the another hot region, the feature point, and the another feature point may be adjusted by means of adjusting boundary coordinates of the first hot region, the another hot region, the feature point, and the another feature point. A computer program code for adjusting the boundary coordinates can be written by one or more program design languages or a combination thereof. The program design languages include object-oriented program design languages such as Java, Smalltalk, C++, and conventional procedural programming languages such as "C" language.

Figure 8:
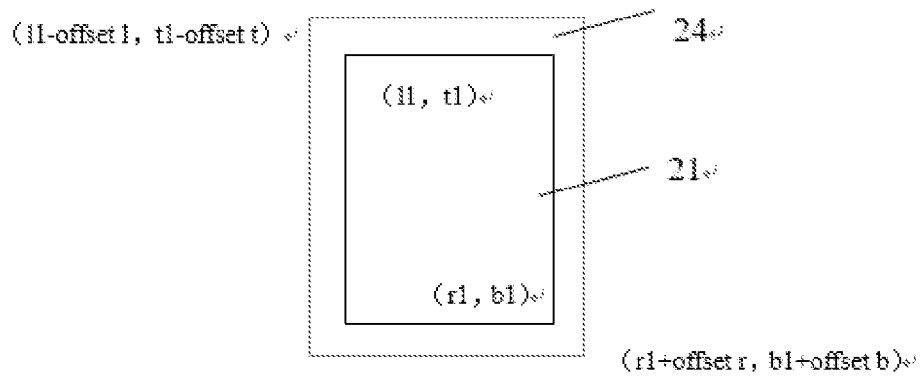

In some embodiments, as shown in FIG. 8, the coordinate position of the upper left corner of the first window 21 is (l1, t1); the coordinate position of the lower right corner of the first window 21 is (r1, b1); the coordinate position of the upper left corner of the first hot region 24 is (l1-offset 1, t1-offset t); and the coordinate position of the lower right corner of the first hot region 24 is (r1+offset r, b1+offset b). Offset 1, offset t, offset r, and offset b respectively refer to offset distances of the first hot region 24 with respect to the first window 21 towards corresponding directions. This distance may be adjusted or modified by means of a server or a terminal. When the feature point T of the second window 22 falls within the boundary range of the first hot region 24, that is, when the coordinates of the feature point T fall within a rectangular region in which the upper left corner and the lower right corner respectively have coordinates of (l1-offset 1, t1-offset t) and (r1+offset r, b1+offset b), the second window 22 may be adsorbed to be automatically laminated on the first window 21, or the first window 21 may be laminated on the second window 22. It should be understood that although the first hot region 24 in the drawings of the present disclosure is illustrated as a rectangular region, the present disclosure is not limited to this. Any other suitable shape can be adopted.

In some embodiments, the window that is laminated above does not cover the window control bar of the window below. Depending on a specific window, the window control bar may include a program or window name, a minimize button, a maximize button, a close button, or the like. In some embodiments, when the second window 22 is laminated on the first window 21, the second window 22 does not cover the window control bar of the first window 21. Correspondingly, when the first window 21 is laminated on the second window 22, the first window 21 does not cover the window control bar of the second window 22. Since the window control bar of the window below is not covered, during window lamination, the window below can still be conveniently called out, or the window below is operated through the window control bar. For example, in some embodiments, as shown in FIG. 2, when the second window 22 is laminated on the first window 21, the second window 22 does not cover the window control bar 51 of the first window 21.

Figure 6:
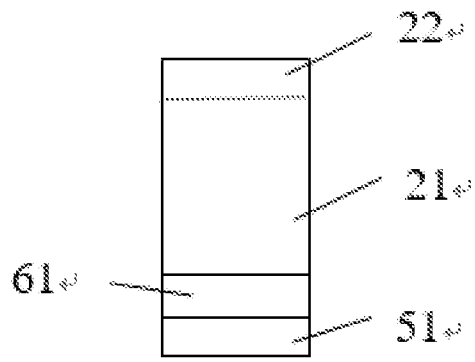

FIG. 6 illustrates a window control bar 61 of the second window 22. As shown in FIG. 6, in some embodiments, the second window 22 is laminated on the first window 21. When the window control bar of the first window 21 and the window control bar of the second window 22 are both located at the bottom of corresponding windows, a lower edge of the window control bar 61 of the second window 22 is aligned with an upper edge of the window control bar 51 of the first window 21. In some embodiments, when the window control bar 51 of the first window 21 and the window control bar 61 of the second window 22 are both located at the top of the corresponding windows, an upper edge of the window control bar 61 of the second window 22 is aligned with a lower edge of the window control bar 51 of the first window 21. In some embodiments, when the window control bar 51 of the first window 21 and the window control bar 61 of the second window 22 are both located at left ends of the corresponding windows, a right edge of the window control bar 51 of the first window 21 is aligned with a left edge of the window control bar 61 of the second window 22. In some embodiments, when the window control bar 51 of the first window 21 and the window control bar 61 of the second window 22 are both located at right ends of the corresponding windows, a left edge of the window control bar 51 of the first window 21 is aligned with a right edge of the window control bar 61 of the second window 22. Of course, these are only exemplary, the windows can be laminated in other suitable ways according to settings of a user terminal or a server.

In some embodiments, the first window 21 is laminated on the second window 22. When the window control bar of the first window 21 and the window control bar of the second window 22 are both located at the bottom of the corresponding windows, the upper edge of the window control bar 61 of the second window 22 is aligned with the lower edge of the window control bar 51 of the first window 21. In some embodiments, when the window control bar 51 of the first window 21 and the window control bar 61 of the second window 22 are both located at the top of the corresponding windows, the lower edge of the window control bar 61 of the second window 22 is aligned with the upper edge of the window control bar 51 of the first window 21. In some embodiments, when the window control bar 51 of the first window 21 and the window control bar 61 of the second window 22 are both located at the left ends of the corresponding windows, the left edge of the window control bar 51 of the first window 21 is aligned with the right edge of the window control bar 61 of the second window 22. In some embodiments, when the window control bar 51 of the first window 21 and the window control bar 61 of the second window 22 are both located at the right ends of the corresponding windows, the right edge of the window control bar 51 of the first window 21 is aligned with the left edge of the window control bar 61 of the second window 22. Of course, these are only exemplary. The windows can be laminated in other suitable ways according to settings of a user terminal or a server.

Figure 9:
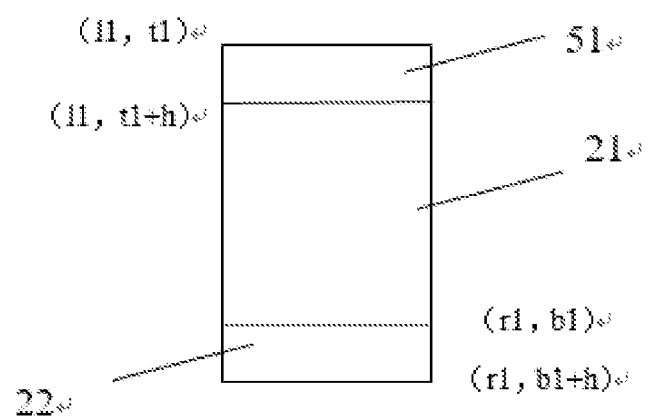

In some embodiments, under an adsorbed lamination mode, n windows are arranged in one column from top to bottom. For example, the position of the upper left corner of the first window 21 is (l1, t1), and the position of the lower right corner of the last window is (rn, bn). Further, as shown in FIG. 9, the second window 22 being adsorbed to be laminated on the first window 21 is taken as an example for illustration below. It is assumed that the window control bar 51 of the first window 21 has a height h, the window control bar is located at the top of the corresponding window, the position of the upper left corner of the first window 21 is (l1, t1), the position of the lower right corner of the first window 21 is (r1, b1), and the upper edge of the window control bar 61 of the second window 22 is aligned with the lower edge of the window control bar 51 of the first window 21, the position of the upper left corner of the second window 22 is (l1, t1+h), and the position of the lower right corner of the second window 22 is (r1, b1+h). Of course, the above is only exemplary. The height of the window control bar 51 of the first window 21 may be a suitable numerical value less than h. At this time, the second window 22 still does not cover the window control bar 51 of the first window 21. As shown in FIG. 9, the lamination of the first window 21 and the second window 22 is realized by means of adjusting the boundary coordinates of the first window 21 or the second window 22.

Figure 7:
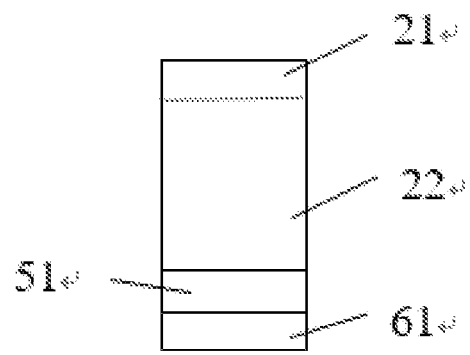

In some embodiments, when the second window 22 is laminated on the first window 21, and the window control bar 51 of the first window 21 is subjected to preset trigger, the first window 21 is laminated on the second window 22, as shown in FIG. 7. In some embodiments, when the first window 21 is laminated on the second window 22, and the window control bar 61 of the first window 22 is subjected to preset trigger, the second window 22 is laminated on the first window 21. In some embodiments, the preset trigger includes a touch operation and operation using an external device, including, but not limited to, touch click, sliding, single click, speech control, and other operations. In some embodiments, when the first window 21 is laminated on the second window 22, the first window 21 does not cover the window control bar 61 of the second window 22.

In FIG. 3, the window display region 20 may be further used to display the third window 23. The first window 21 may further correspond to a second hot region 25. In some embodiments, the boundary range of the first hot region 24 is different from a boundary range of the second hot region 25, and the region where the first hot region 24 is located is included in the boundary range of the second hot region 25.

In some embodiments, the third window 23 corresponds to a feature point Z. In FIG. 3, the feature point Z is illustrated as a position at the upper left corner of the third window 23. However, it should be understood that the feature point Z may be located at any coordinate position in the third window 23, for example, includes, but is not limited to positions of an upper left corner, an upper right corner, a lower left corner or a lower right corner of the third window 23, or even a positon outside of the third window 23. It should be understood that the positions of the feature point Z, the first hot region 24, and the second hot region 25 may be adjusted by means of adjusting the boundary coordinates of the feature point Z, the first hot region 24, and the second hot region 25, which will not be described in detail here to avoid repetition. In addition, the boundary ranges of the first hot region 24 and the second hot region 25 can be updated or changed in real time by the server or the user terminal.

In some embodiments, the window arrangement method of the present disclosure further includes that when the feature point Z of the third window 23 falls within the boundary range of the second hot region 25 in response to the operation event of the user, and is outsidethe boundary range of the first hot region 24, the third window 23 and the first window 21 are adjacent to each other. The operation event of the user generally includes moving the third window 23, including, but not limited to, touch click dragging, sliding, speech control, and other operations. In some embodiments, for example, when the feature point Z of the third window 23 falls within the boundary range of the second hot region 25 in response to the operation event of the user and is outside the boundary range of the first hot region 24, a space between the first window 21 and the second window 22 is possibly not large enough to accommodate the third window 23. At this time, the second window 22 moves rightwards (if the first window 21 is located on the right of the second window 22, the second window 22 moves leftwards) till the first window 21 and the third window 23 can be adjacently arranged. In some embodiments, when the first window 21 and the third window 23 are adjacently arranged, any suitable alignment method such as top alignment and bottom alignment can be used.

It can be known from the above that in the window arrangement method provided by the embodiment of the present disclosure, the first window corresponds to the first hot region, and the second window corresponds to the feature point. When the feature point of the second window falls within the boundary range of the first hot region in response to the operation event of the user, the second window is automatically laminated on the first window so that the window display region is neater and more orderly. In addition, by means of establishing the first hot region and the second hot region for automatic sensing and adsorption of windows, the orderliness and the convenience of lamination or adjacent arrangement of the windows are improved, so that the need of the user for displaying and arranging a plurality of windows in the multi-task environment is met, and further, the user experience is improved.

In some embodiments, the currently operated windows (temporarily not shown) may also be laminated. Referring to FIG. 3 again, three windows are displayed currently: the first window 21, the second window 22, and the third window 23. By triggering a laminated display mode of the windows, for example, by clicking a set button, gesture operation, speech control, etc., the system selects a window (such as the first window 21) from the one or more displayed windows. The selection can be based on a space for lamination, user's preference settings, and the like. For example, in some embodiments, the selected window may be the window with the operating time closest to the current time. Which window is the window closest to the current time can be confirmed by means of recording the operating time of the window or the operating order of the window. In some embodiments, the selected window is a window with a sufficient display space, and the sufficient display space is convenient for realizing the lamination of the windows. Then, the system identifies the boundary coordinates of the first window 21, and adjusts the boundary coordinates of the currently operated window according to the boundary coordinates of the first window 21, so that the currently operated window is laminated on the first window 21. The currently operated window can be a window restored from a minimized window or a newly opened window. In some embodiments, the currently operated window is laminated on the first window 21, wherein the currently operated window does not cover the window control bar of the first window 21. The detailed lamination method of laminating the currently operated window on the first window 21 can refer to the lamination method of laminating the second window 22 on the first window 21 described above, which will not be described in detail here to avoid repetition.

Figure 10:
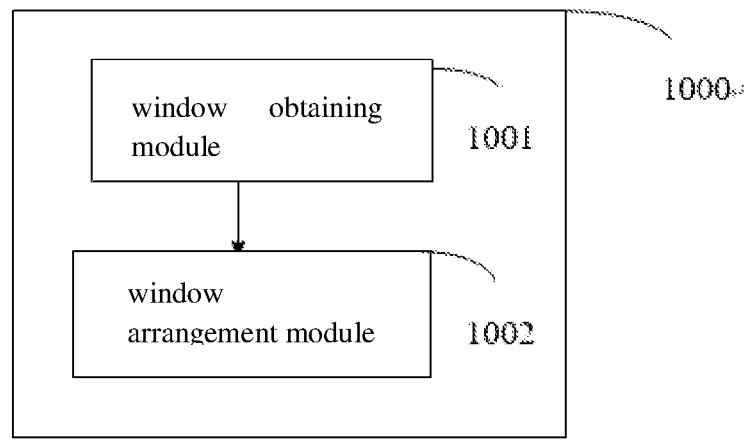
FIG. 10 illustrates a schematic diagram of a window arrangement apparatus according to an embodiment of the present disclosure.

As shown in FIG. 10, corresponding to the window arrangement method provided in the above-mentioned embodiment, an embodiment of the present disclosure further provides a window arrangement apparatus 1000. The apparatus 1000 includes: a window obtaining module 1001 configured to obtain, according to a preset trigger operation, a first window and a second window (such as a first window 21 and a second window 22) to be arranged. In some embodiments, the preset trigger operation may include, but is not limited to, touch click, sliding, single click, speech control, and other operations.

In some embodiments, the apparatus 1000 further includes a window arrangement module 1002 configured to laminate the first window 21 and the second window 22 by means of adjusting boundary coordinates of the first window 21 or the second window 22, wherein one, which is laminated above, of the first window 21 and the second window 22 does not cover a window control bar of the window below.

In some embodiments, laminating the first window 21 and the second window 22 includes that the first window 21 corresponds to a first hot region 24, and the second window 22 corresponds to a feature point; and when the feature point corresponding to the second window 22 falls within a boundary range of the first hot region 24 in response to an operation event of a user, the first window 21 and the second window 22 are laminated. Laminating the first window 21 and the second window 22 includes: laminating the first window 21 on the second window 22, or laminating the second window 22 on the first window 21.

In some embodiments, a region where the first window 21 is located is included in the boundary range of the first hot region 24, or the first hot region 24 is located within part of a region where the first window 21 is located.

In some embodiments, the feature point of the second window 22 is located inside or outside the second window 22.

In some embodiments, the feature point of the second window 22 is located at the position at the upper left corner, the upper right corner, the lower left corner, or the lower right corner of the second window 22.

In some embodiments, the lamination of the first window 21 and the second window 22 includes: performing left alignment, right alignment, left-right centering alignment, top alignment, bottom alignment, or top-bottom centering alignment on the first window and the second window.

In some embodiments, when a window control bar of the first window 21 and a window control bar of the second window 22 are both located at the top of the corresponding windows, and the second window 22 is laminated on the first window 21, an upper edge of the window control bar of the second window 22 is aligned with a lower edge of the window control bar of the first window 21. When the window control bar of the first window 21 and the window control bar of the second window 22 are both located at the bottom of the corresponding windows, and the second window 22 is laminated on the first window 21, a lower edge of the window control bar of the second window 22 is aligned with an upper edge of the window control bar of the first window 21.

In some embodiments, when the window control bar of the first window 21 and the window control bar of the second window 22 are both located at the top of the corresponding windows, and the first window 21 is laminated on the second window 22, the upper edge of the window control bar of the first window 21 is aligned with the lower edge of the window control bar of the second window 22. When the window control bar of the first window 21 and the window control bar of the second window 22 are both located at the bottom of the corresponding windows, and the first window 21 is laminated on the second window 22, the lower edge of the window control bar of the second window 21 is aligned with the upper edge of the window control bar of the second window 22.

In some embodiments, when the window control bar of the first window 21 and the window control bar of the second window 22 are both located at left ends of the corresponding windows, and the second window 22 is laminated on the first window 21, a left edge of the window control bar of the second window 22 is aligned with a right edge of the window control bar of the first window 21. When the window control bar of the first window 21 and the window control bar of the second window 22 are both located at right ends of the corresponding windows, and the second window 22 is laminated on the first window 21, a right edge of the window control bar of the second window 22 is aligned with a left edge of the window control bar of the first window 21.

In some embodiments, when the window control bar of the first window 21 and the window control bar of the second window 22 are both located at the left ends of the corresponding windows, and the first window 21 is laminated on the second window 22, the left edge of the window control bar of the first window 21 is aligned with the right edge of the window control bar of the second window 22. When the window control bar of the first window 21 and the window control bar of the second window 22 are both located at the right ends of the corresponding windows, and the first window 21 is laminated on the second window 22, the right edge of the window control bar of the first window 21 is aligned with the left edge of the window control bar of the second window 22.

In some embodiments, when the second window 22 is laminated on the first window 21, and the window control bar of the first window 21 is subjected to preset trigger, the first window 21 is laminated on the second window 22.

In some embodiments, when the first window 21 is laminated on the second window 22, and the window control bar of the second window 22 is subjected to preset trigger, the second window 22 is laminated on the first window 21.

In some embodiments, a third window 23 is further displayed. The first window 21 also corresponds to a second hot region 25, and the third window 23 corresponds to a feature point. The boundary range of the first hot region 24 is different from a boundary range of the second hot region 25, and a region where the first hot region 24 is located is included in the boundary range of the second hot region 25. The window arrangement method further includes that when the feature point of the third window 23 falls within the boundary range of the second hot region 25 in response to the operation event of the user and is outside the boundary range of the first hot region 24, the third window 23 and the first window 21 are adjacently arranged.

In some embodiments, the feature point of the third window 23 is located inside or outside the third window 23.

In some embodiments, obtaining the first window and the second window to be arranged includes: selecting the first window from one or more displayed windows by means of triggering the laminated display mode, and determining the currently operated window as the second window. Laminating the first window and the second window includes laminating the currently operated second window on the first window. In some embodiments, the second window does not cover the window control bar of the first window. In some embodiments, laminating the currently operated second window on the first window includes: identifying boundary coordinates of the first window; and adjusting boundary coordinates of the second window according to the boundary coordinates of the first window so that the currently operated second window is laminated on the first window.

In addition, the present disclosure further provides a terminal including at least one memory and at least one processor, wherein the memory is used for storing program codes. The processor is used for calling the program codes stored in the memory to execute the above-mentioned window arrangement method.

In addition, the present disclosure further provides a computer storage medium. The computer storage medium stores program codes. The program codes are used for executing the above-mentioned window arrangement method.

Figure 11:
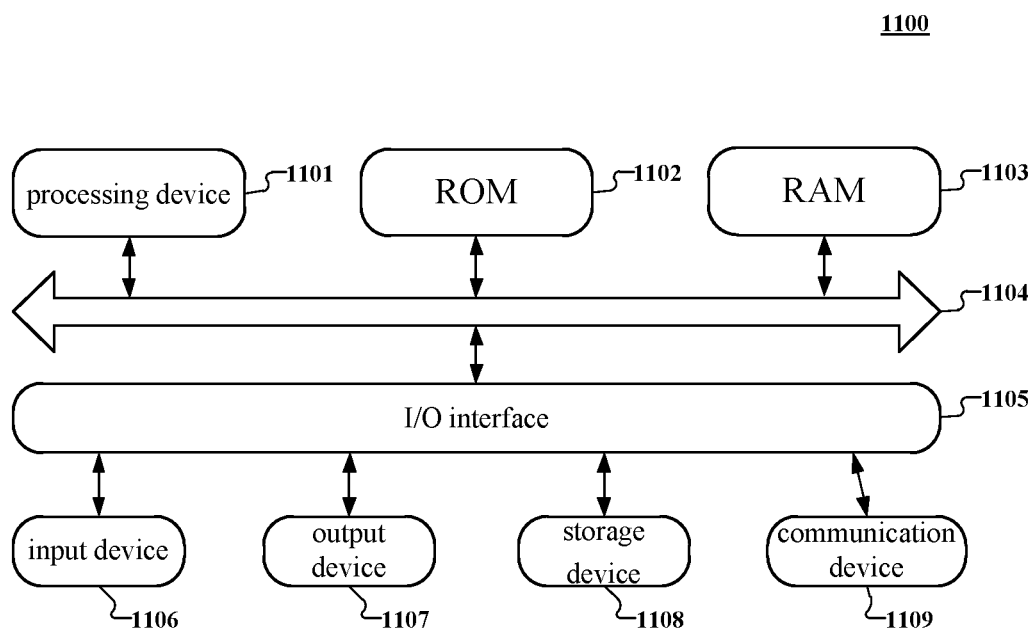
FIG. 11 is a schematic structural diagram of an electronic device applied to realize the embodiments of the present disclosure.

Referring to FIG. 11 below, a schematic structural diagram of an electronic device 1100 suitable for being used to realize the embodiments of the present disclosure is illustrated. Terminal devices in the embodiments of the present disclosure may include, but are not limited to, mobile terminals such as mobile phones, notebook computers, digital broadcast receivers, personal digital assistants (PDAs), PADs, portable multimedia players (PMPs) and vehicle-mounted terminals (for example, vehicle-mounted navigation terminals), and fixed terminals such as digital TVs and desktop computers. The electronic device shown in FIG. 11 is only an example, and should not bring any limitation to the functions and the scope of use of the embodiments of the present disclosure.

As shown in FIG. 11, the electronic device 1100 may include a processing device (e.g., a central processor, a graphics processor, etc.) 1101 that may perform a variety of suitable actions and processes in accordance with a program stored in a read-only memory (ROM) 1102 or a program loaded from a storage device 1108 into a random access memory (RAM) 1103. In the RAM 1103, various programs and data required for the operation of the electronic device 1100 are also stored. The processing device 1101, the ROM 1102 and the RAM 1103 are connected to each other via a bus 1104. An input/output (I/O) interface 1105 is also connected to the bus 1104.

In general, the following devices may be connected to the I/O interface 1105: an input device 1106 including, for example, a touch screen, a touch pad, a keyboard, a mouse, a camera, a microphone, an accelerometer, a gyroscope, etc.; an output device 1107 including, for example, a liquid crystal display (LCD), a speaker, a vibrator, etc.; a storage device 1108 including, for example, magnetic tape, hard disk, etc.; and a communication device 1109. The communication device 1109 may allow the electronic device 1100 to communicate in a wireless or wired manner with other devices to exchange data. Although FIG. 11 illustrates a electronic device 1100 having a variety of devices, it should be understood that not all illustrated devices are required to be implemented or provided. More or fewer devices may alternatively be implemented or provided.

Particularly, in accordance with embodiments of the present disclosure, the processes described above with reference to the flowcharts may be implemented as computer software programs. For example, embodiments of the present disclosure include a computer program product comprising a computer program carried on a computer-readable medium, the computer program containing program code for performing the methods shown in the flowchart. In such an embodiment, the computer program may be downloaded and installed from the network via the communication device 1109, or installed from the storage device 1108, or installed from the ROM 1102. When the computer program is executed by the processing device 1101, the above-mentioned functions defined in the method of the embodiments of the present disclosure are performed.

It should be noted that the computer storage media described in embodiments of the present disclosure may be computer readable signal media or computer readable storage media or any combination of the two. The computer-readable storage medium may be, for example but not limited to, an electrical, magnetic, optical, electromagnetic, infrared, or semiconductor system, apparatus, or device, or any combination thereof. More specific examples of computer-readable storage media may include, but are not limited to: an electrical connection having one or more wires, a portable computer diskette, a hard disk, a random access memory (RAM), a read only memory (ROM), an erasable programmable read-only memory (EPROM) or flash memory (FLASH), an optical fiber, a compact disc read-only memory (CD-ROM), an optical storage device, a magnetic storage device, or any suitable combination thereof. In the present disclosure, a computer-readable storage medium can be any tangible medium that can contain or store a program for use by or in connection with an instruction execution system, apparatus, or device. In the present disclosure, a computer-readable signal medium may include a data signal that propagates in baseband or as part of a carrier wave, carrying computer-readable program code. Such propagated data signals may take many forms, including but not limited to electromagnetic signals, optical signals, or any suitable combination thereof. The computer-readable signal medium may also be any computer-readable medium other than the computer-readable storage medium that can transmit, propagate, or transport the program for use by or in connection with the instruction execution system, apparatus, or device. The program code embodied on the computer-readable medium may be transmitted using any suitable medium including, but not limited to: wire, fiber optic cable, radio frequency (RF), and the like, or any suitable combination thereof.

In some embodiments, the client and server can communicate with any currently known or future-developed network protocol such as HTTP (HyperText Transfer Protocol), and can communicate (for example, by communication network) with digital data in any form or medium. Examples of communication networks include local area networks ("LAN"), wide area networks ("WAN"), the Internet (for example, the Internet), and end-to-end networks (for example, ad hoc end-to-end networks), as well as any currently known or future-developed network.

The computer-readable medium can be contained in the electronic device; it may also be separate and not assembled into the electronic device.

Computer program code for carrying out operations of the present disclosure may be written in one or more programming languages, including object-oriented programming languages such as Java, Smalltalk, C++, and conventional procedural programming languages such as the "C" language or similar programming languages. The program code may execute entirely on the user's computer, partially on the user's computer, as a stand-alone software package, partially on the user's computer, partially on a remote computer, or entirely on a remote computer or server. In the case of a remote computer, the remote computer may be connected to the user computer through any kind of network, including a local area network (LAN) or a wide area network (WAN), or may be connected to an external computer (e.g., through the Internet using an Internet service provider).

The flowcharts and block diagrams in the drawings illustrate the architecture, functionality, and operation of possible implementations of systems, methods, and computer program products in accordance with various embodiments of the present disclosure. In this regard, each block of the flowcharts or block diagrams may represent a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may, in fact, be executed substantially concurrently or they may sometimes be executed in the reverse order, depending upon the functionality involved. It is also noted that each block of the block diagrams and/or flowchart illustrations, and combinations of blocks in the block diagrams and/or flowchart illustrations, can be implemented by special purpose hardware-based systems which perform the specified functions or operations, or combinations of special purpose hardware and computer instructions.

The units described in the embodiments of the present disclosure may be implemented in software or in hardware. Among them, the names of these units do not constitute a limitation on the unit itself under certain circumstances.

The functions described hereinabove may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, equiment, or device, or any suitable combination of the foregoing. More specific examples of machine-readable storage media may include electrical connections based on one or more wires, portable computer disks, hard drives, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, a window arrangement method is provided, comprising: obtaining, according to a preset trigger operation, a first window and a second window to be arranged; laminating the first window and the second window by means of adjusting boundary coordinates of the first window or the second window, wherein the first window and the second window partially overlap.

According to one or more embodiments of the present disclosure, laminating the first window and the second window comprises: enabling the first window to correspond to a first hot region and the second window to correspond to a feature point; and laminating the first window and the second window when the feature point corresponding to the second window falls within a boundary range of the first hot region in response to an operation event of a user.

According to one or more embodiments of the present disclosure, a region where the first window is located is included in the boundary range of the first hot region, or the first hot region is located within part of the region where the first window is located.

According to one or more embodiments of the present disclosure, laminating the first window and the second window comprises laminating the second window on the first window, or laminating the first window on the second window.

According to one or more embodiments of the present disclosure, the feature point is located inside or outside the second window.

According to one or more embodiments of the present disclosure, the feature point is located at a position of an upper left corner, an upper right corner, a lower left corner, or a lower right corner of the second window.

According to one or more embodiments of the present disclosure, laminating the first window and the second window comprises: performing left alignment, right alignment, left-right centering alignment, top alignment, bottom alignment, or top-bottom centering alignment on the first window and the second window.

According to one or more embodiments of the present disclosure, one, which is laminated above, of the first window and the second window does not cover a window control bar of the window below.

According to one or more embodiments of the present disclosure, when a window control bar of the first window and a window control bar of the second window are both located at the top of corresponding windows, and the second window is laminated on the first window, an upper edge of the window control bar of the second window is aligned with a lower edge of the window control bar of the first window; and when the window control bar of the first window and the window control bar of the second window are both located at the bottom of the corresponding windows, and the second window is laminated on the first window, a lower edge of the window control bar of the second window is aligned with an upper edge of the window control bar of the first window.

According to one or more embodiments of the present disclosure, when a window control bar of the first window and a window control bar of the second window are both located at left ends of the corresponding windows, and the first window is laminated on the second window, a left edge of the window control bar of the first window is aligned with a right edge of the window control bar of the second window; and when the window control bar of the first window and the window control bar of the second window are both located at right ends of the corresponding windows, and the first window is laminated on the second window, a right edge of the window control bar of the first window is aligned with a left edge of the window control bar of the second window.

According to one or more embodiments of the present disclosure, when the second window is laminated on the first window, and a window control bar of the first window is subjected to preset trigger, the first window is laminated on the second window; and when the first window is laminated on the second window, and a window control bar of the second window is subjected to preset trigger, the second window is laminated on the first window.

According to one or more embodiments of the present disclosure, a third window is further displayed; the first window further corresponds to a second hot region; the third window corresponds to a feature point; the boundary range of the first hot region is different from a boundary range of the second hot region; the region where the first hot region is located is included in the boundary range of the second hot region; the window arrangement method further comprises: adjacently arranging the third window and the first window when the feature point corresponding to the third window falls within the boundary range of the second hot region in response to the operation event of the user and is outside the boundary range of the first hot region.

According to one or more embodiments of the present disclosure, the feature point corresponding to the third window is located inside or outside the third window.

According to one or more embodiments of the present disclosure, obtaining the first window and the second window to be arranged comprises: by means of triggering a laminated display mode, selecting the first window from one or more displayed windows, and determining a currently operated window as the second window; and laminating the first window and the second window comprises laminating the currently operated second window on the first window.

According to one or more embodiments of the present disclosure, the second window does not cover a window control bar of the first window.

According to one or more embodiments of the present disclosure, laminating the currently operated second window on the first window comprises: identifying boundary coordinates of the first window; adjusting boundary coordinates of the second window according to the boundary coordinates of the first window so that the currently operated second window is laminated on the first window.

According to one or more embodiments of the present disclosure, a window arrangement apparatus is provided, comprising: a window obtaining module, configured to obtain, according to a preset trigger operation, a first window and a second window to be arranged; and a window arrangement module, configured to laminate the first window and the second window by means of adjusting boundary coordinates of the first window or the second window, wherein the first window and the second window partially overlap.

According to one or more embodiments of the present disclosure, a terminal is provided, comprising: at least one memory and at least one processor, wherein the memory is used for storing program codes; the processor is used for calling the program codes stored in the memory to execute the above window arrangement method.

According to one or more embodiments of the present disclosure, a computer storage medium is provided, wherein the computer storage medium stores program codes; the program codes are used for executing the above window arrangement method.

The above description is only a preferred embodiment of the present disclosure and an explanation of the applied technical principles. Those skilled in the art should understand that the scope of disclosure involved in this disclosure is not limited to the technical solutions formed by the specific combination of the above technical features, and should also cover other combinations formed by the above technical features or their equivalent features. Technical solutions. For example, the above-mentioned features and the technical features disclosed in the present disclosure (but not limited to) having similar functions are replaced with each other to form a technical solution.

In addition, although the operations are depicted in a specific order, this should not be understood as requiring these operations to be performed in the specific order shown or performed in a sequential order. Under certain circumstances, multi-task and parallel processing may be advantageous. Likewise, although several specific implementation details are included in the above discussion, these should not be construed as limiting the scope of the present disclosure.

Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A window arrangement method, comprising:
obtaining, according to a preset trigger operation, a first window and a second window to be arranged; and
laminating the first window and the second window by means of adjusting boundary coordinates of the first window or the second window,
wherein the first window and the second window partially overlap;
wherein laminating the first window and the second window comprises:
enabling the first window to correspond to a first hot region and the second window to correspond to a feature point; and
laminating the first window and the second window when the feature point corresponding to the second window falls within a boundary range of the first hot region in response to an operation event of a user;
wherein a third window is further displayed; the first window further corresponds to a second hot region; the third window corresponds to a feature point; the boundary range of the first hot region is different from a boundary range of the second hot region; the region where the first hot region is located is included in the boundary range of the second hot region; the window arrangement method further comprises:
adjacently arranging the third window and the first window when the feature point corresponding to the third window falls within the boundary range of the second hot region in response to the operation event of the user and is outside the boundary range of the first hot region.

2. The window arrangement method according to claim 1, wherein a region where the first window is located is included in the boundary range of the first hot region, or the first hot region is located within part of the region where the first window is located.

3. The window arrangement method according to claim 1, wherein laminating the first window and the second window comprises: laminating the second window on the first window, or laminating the first window on the second window.

4. The window arrangement method according to claim 1, wherein the feature point is located inside or outside the second window.

5. The window arrangement method according to claim 1, wherein the feature point is located at a position of an upper left corner, an upper right corner, a lower left corner, or a lower right corner of the second window.

6. The window arrangement method according to claim 1, wherein laminating the first window and the second window comprises:
performing left alignment, right alignment, left-right centering alignment, top alignment, bottom alignment, or top-bottom centering alignment on the first window and the second window.

7. The window arrangement method according to claim 1, wherein one window, which is laminated above, of the first window and the second window does not cover a window control bar of the window below.

8. The window arrangement method according to claim 3, wherein when a window control bar of the first window and a window control bar of the second window are both located at a top of corresponding windows, and the second window is laminated on the first window, an upper edge of the window control bar of the second window is aligned with a lower edge of the window control bar of the first window; and
when the window control bar of the first window and the window control bar of the second window are both located at a bottom of the corresponding windows, and the second window is laminated on the first window, a lower edge of the window control bar of the second window is aligned with an upper edge of the window control bar of the first window.

9. The window arrangement method according to claim 3, wherein when a window control bar of the first window and a window control bar of the second window are both located at left ends of the corresponding windows, and the first window is laminated on the second window, a left edge of the window control bar of the first window is aligned with a right edge of the window control bar of the second window; and
when the window control bar of the first window and the window control bar of the second window are both located at right ends of the corresponding windows, and the first window is laminated on the second window, a right edge of the window control bar of the first window is aligned with a left edge of the window control bar of the second window.

10. The window arrangement method according to claim 1, wherein when the second window is laminated on the first window, and a window control bar of the first window is subjected to preset trigger, the first window is laminated on the second window; and
when the first window is laminated on the second window, and a window control bar of the second window is subjected to preset trigger, the second window is laminated on the first window.

11. The window arrangement method according to claim 1, wherein the feature point corresponding to the third window is located inside or outside the third window.

12. The window arrangement method according to claim 1, wherein obtaining the first window and the second window to be arranged comprises:
by means of triggering a laminated display mode, selecting the first window from one or more displayed windows, and determining a currently operated window as the second window; and
laminating the first window and the second window comprises:
laminating the currently operated second window on the first window.

13. The window arrangement method according to claim 12, wherein the second window does not cover a window control bar of the first window.

14. The window arrangement method according to claim 12, wherein laminating the currently operated second window on the first window comprises:
identifying boundary coordinates of the first window; and
adjusting boundary coordinates of the second window according to the boundary coordinates of the first window so that the currently operated second window is laminated on the first window.

15. A terminal, comprising:
at least one memory and at least one processor,
wherein the memory is used for storing program codes; the processor is used for calling the program codes stored in the memory to execute a window arrangement method comprising:
obtaining, according to a preset trigger operation, a first window and a second window to be arranged; and
laminating the first window and the second window by means of adjusting boundary coordinates of the first window or the second window,
wherein the first window and the second window partially overlap;
wherein laminating the first window and the second window comprises:
enabling the first window to correspond to a first hot region and the second window to correspond to a feature point; and
laminating the first window and the second window when the feature point corresponding to the second window falls within a boundary range of the first hot region in response to an operation event of a user;
wherein a third window is further displayed; the first window further corresponds to a second hot region; the third window corresponds to a feature point the boundary range of the first hot region is different from a boundary range of the second hot region; the region where the first hot region is located is included in the boundary range of the second hot region; the window arrangement method further comprises:
adjacently arranging the third window and the first window when the feature point corresponding to the third window falls within the boundary range of the second hot region in response to the operation event of the user and is outside the boundary range of the first hot region.

16. A non-transitory computer storage medium, wherein the computer storage medium stores program codes; the program codes, when executed by a processor, cause the processor to implement a window arrangement method comprising:
obtaining, according to a preset trigger operation, a first window and a second window to be arranged; and
laminating the first window and the second window by means of adjusting boundary coordinates of the first window or the second window,
wherein the first window and the second window partially overlap;
wherein laminating the first window and the second window comprises:
enabling the first window to correspond to a first hot region and the second window to correspond to a feature point; and
laminating the first window and the second window when the feature point corresponding to the second window falls within a boundary range of the first hot region in response to an operation event of a user;
wherein a third window is further displayed; the first window further corresponds to a second hot region; the third window corresponds to a feature point the boundary range of the first hot region is different from a boundary range of the second hot region; the region where the first hot region is located is included in the boundary range of the second hot region; the window arrangement method further comprises:

adjacently arranging the third window and the first window when the feature point corresponding to the third window falls within the boundary range of the second hot region in response to the operation event of the user and is outside the boundary range of the first hot region.

17. The terminal according to claim 15, wherein laminating the first window and the second window comprises:

enabling the first window to correspond to a first hot region and the second window to correspond to a feature point; and laminating the first window and the second window when the feature point corresponding to the second window falls within a boundary range of the first hot region in response to an operation event of a user.

18. The terminal according to claim 17, wherein a region where the first window is located is included in the boundary range of the first hot region, or the first hot region is located within part of the region where the first window is located.

* * * * *